United States Patent [19]

Maklad et al.

[11] 4,201,151
[45] May 6, 1980

[54] APPARATUS AND METHODS OF COATING FILAMENTS WITH POLYMERS

[75] Inventors: Mokhtar S. Maklad; Pablo C. Pureza, both of Roanoke, Va.

[73] Assignee: International Telephone and Telegraph Corporation, New York, N.Y.

[21] Appl. No.: 896,842

[22] Filed: Apr. 17, 1978

[51] Int. Cl.² ............................................. B05B 5/00
[52] U.S. Cl. .................................. 118/642; 118/405; 118/612
[58] Field of Search ........................ 118/642, 405, 612

[56] References Cited
U.S. PATENT DOCUMENTS

| | | | |
|---|---|---|---|
| 2,647,488 | 8/1953 | Shive | 118/642 |
| 4,034,703 | 7/1977 | Scheiber et al. | 118/405 |
| 4,144,838 | 3/1979 | Ichiyanagy et al. | 118/405 |

*Primary Examiner*—Bernard D. Pianalto
*Attorney, Agent, or Firm*—John T. O'Halloran; Peter C. Van Der Sluys

[57] ABSTRACT

An optical fiber or similar article is coated by directing the fiber through a spherical mixing vessel. Two silicone RTV components are directed by means of an annular feed mechanism into the mixing vessel at predetermined flow rates. The motion of the fiber directed through the vessel produces a churning or agitation of the silicone components to uniformly and homogeneously coat the fiber with the mixed components and provide a protective elastomeric coating about the fiber.

12 Claims, 1 Drawing Figure

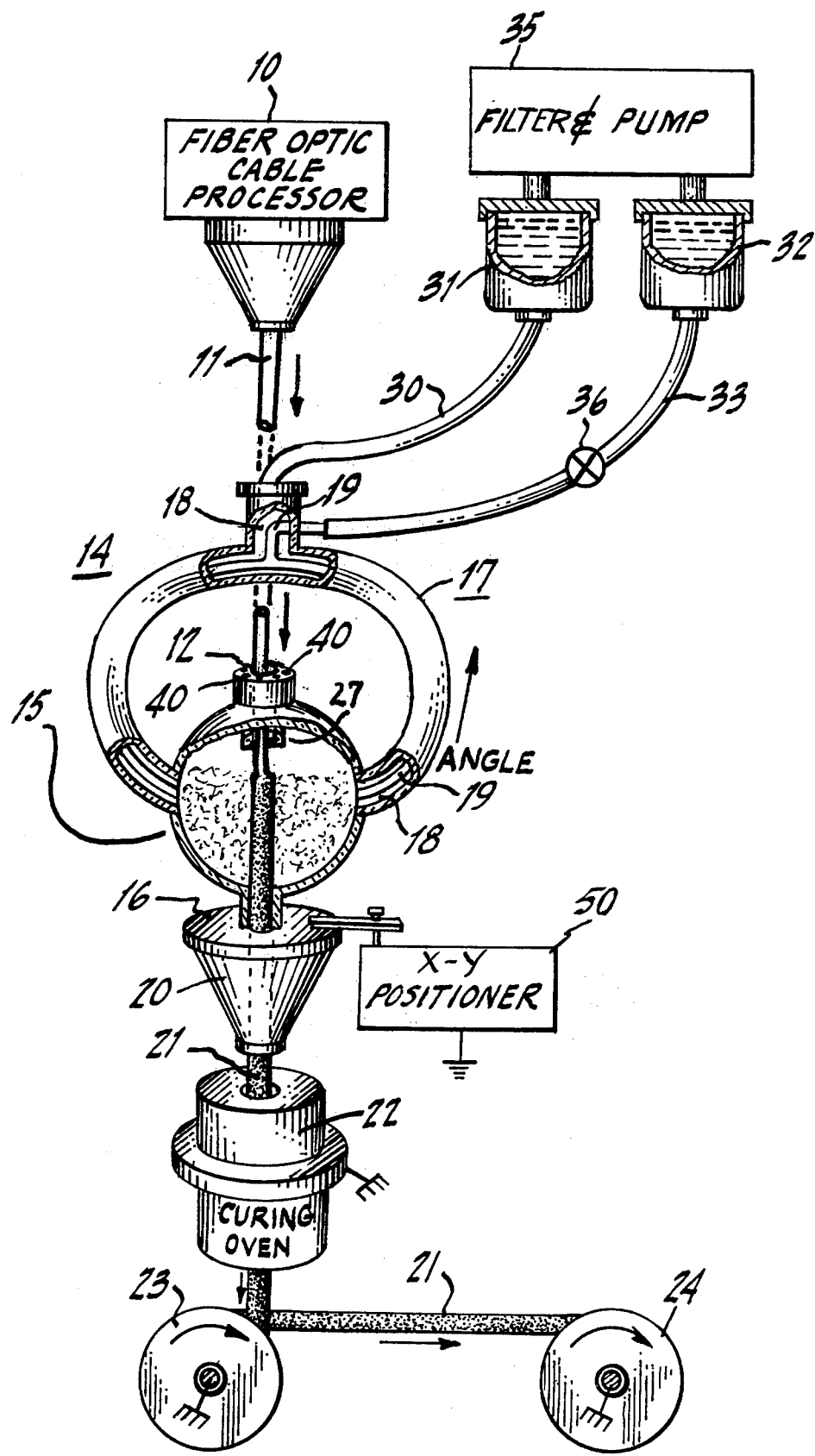

4,201,151

APPARATUS AND METHODS OF COATING FILAMENTS WITH POLYMERS

BACKGROUND OF THE INVENTION

Optical fibers are increasingly being employed in communications and other systems due to their high data rate capability, compact dimensions and based on many other factors.

Essentially, there is a need to produce such fibers economically without sacrificing reliability.

In order to preserve the strength characteristics of an optical fiber, a protective coating must be applied to the fiber after forming. This procedure may employ a suitable elastomeric such as silicone as coating. The silicone coating employs a two component mix which includes a base component (RTV) and a suitable catalyst. Upon the controlled mixing of the base component and catalyst, a silicone polymer is formed. The mixing operation does not lend itself to large scale or mass production techniques as the service life of the system is limited by the properties of the components being employed. Since the mixed base component and the catalyst have curing properties which vary depending on their pot life, this limits the useful life of the components and limits the length of optical fiber which may be coated by the silicone during a given time.

It is understood that silicone is a polymer possessing elastic properties and as such, is generically referred to as an elastomer. Basically, these materials are used in forming seals, gaskets and electronic potting compounds. The silicone elastomers have dimethyl siloxane groups as a backbone and members differ mainly in the nature of the organic substituents on the Si atoms and the degree of polymerization. The chemical combination of organic and inorganic materials give the silicone elastomers useful properties over wide temperature ranges ($-70°$ to $225°$ C.) and the formation of such polymers by base and catalyst components is well known.

It is therefore an object of the present invention to prolong the pot life of the mixed silicone components by introducing unlimited supplies of unmixed base and catalyst components under control of a unique mixing technique and apparatus.

BRIEF DESCRIPTION OF PREFERRED EMBODIMENT

A process for coating an optical fiber with a polymer; which polymer is formed by the mixing of two components which includes introducing a first component into a mixing vessel and introducing a second component into a mixing vessel. A fiber is directed through the mixing vessel at a predetermined speed which is selected to agitate the first and second components to produce a flow pattern about the fiber to cause the agitated components to uniformly coat the fiber with the polymer. The mixing vessel which is also described essentially comprises a spherical chamber having an inlet and an outlet port along a given axis. Each of the ports communicate with the internal hollow of the vessel. An annular tubular delivery means is coupled between two ports transverse to the inlet and outlet ports. The delivery means includes two coaxial tubes for directing the first and second components of the polymer into the mixing vessel to achieve the above noted agitation and coating of the fiber. Other features depict the various techniques for controlling the flow of the materials in providing a closed system wherein deleterious substances are excluded, hence preserving the strength and characteristics of the elastomeric coating for the fiber.

BRIEF DESCRIPTION OF THE DRAWINGS

The sole FIGURE is a perspective view partially in block form depicting an apparatus used in a fiber coating process according to this invention.

DETAILED DESCRIPTION OF THE INVENTION

Referring to the FIGURE, there is shown a fiber optic processor 10. Essentially, the formation or processing of a fiber optic or filament structure is well known in the prior art. Present investigations and techniques permit the formation of such fibers by continuous processes utilizing chemical vapor deposition of glass within R.F. excited glow discharges. These techniques provide sufficient streams of glass materials for producing optical fibers.

Other techniques as may be employed in the processor 10 produce fibers by the deposition of glass forming ingredients on heated mandrils as well as other techniques existing in the prior art which form optical fibers by using multistepped, funnel shaped heating vessels to form solid glass rods which are then heated and drawn into fibers. Hence, the processor 10 may incorporate any such technique for forming an optical fiber and for directing the fiber 11 to a suitable coating facility.

It is understood that in order to preserve the strength characteristics of a fiber 11, a protective coating must be formed and relatively independently of the process used in fabricating the fiber 11. Hence, the fiber 11 is directed at a controlled rate into an inlet aperture 12 of a glass-bubble mixing vessel 14.

Essentially, the mixing vessel 14 comprises a central spherical mixing portion 15 through which the fiber optic cable 11 is directed. As shown, the spherical portion has an inlet port 12 and an outlet port 16. The entire mixing vessel is fabricated from a non-reactive material such as a pyrex glass. The spherical portion 15 is approximately one inch in diameter. Connected to the spherical portion 15 is an annular delivery section 17. Section 17 comprises a first outer tube 18 which, as will be explained, transports the base materials for formation of the elastomer coating. The outer tube 18 is also fabricated from a suitable glass as pyrex and may be approximately 10 mm. in diameter. Relatively coaxial with the outer tube 18 is an inner tube 19. The inner tube 19 is also fabricated from pyrex and is approximately 4 mm. in diameter. As will be explained, the coaxial inner tube is adapted to transport the catalyst component necessary to mix with the base component transported by the outer tube 18 to form the silicone elastomer. Each tube as 18 and 19 is directed into the spherical mixing portion 15 at opposite ends to thus form a closed system. The diameter of the annular delivery section 17 is approximately two and one-half inches from the outer ends of tube 18 across the diameter. The annular tubes 18 and 19 are directed from the spherical portion 15 of the mixing vessel 14 at an angle selected between 35 to 45 degrees with respect to the central axis of the fiber 11 as directed through the input and output ports 12 and 16. The output port 16 is coupled to a suitable nozzle 20 to direct the coated fiber 21 through a curing apparatus 22. Apparatus 22 may comprise a radiant heater or conventional oven for positively curing the elastomer coating now impressed upon cable 11, as will be explained. The coated fiber 21 is directed into a take-up pulley 23 which is rotated according to a desired speed controlling the cable travel. The system for rotating the take-up pulley 23 is not shown as such devices are known in the art. The cable is thence directed to a spool location 24, whereby desired lengths of fiber may be spooled for future use or sale.

The coating operation as accomplished by a dip-coating mixing technique will now be described.

The outer tube 18 of the annular delivery section 17 accommodates the base component necessary to formulate the elastomer. In this manner, the outer tube 18 is coupled to a delivery hose 30 which is directed to a base component reservoir 31. The reservoir 31 receives filtered or pure base materials from a filter and pumping station 35. Essentially, the base materials or components are filtered to rid them of impurities and them pumped into reservoir 31. Similarly, the catalyst material is filtered and pumped into reservoir 32 associated with and coupled to the inner coaxial tube 19 via the delivery hose 33 connected between tube 19 and reservoir 32.

Shown located in the flow path between the inner tube 19 and delivery tube 33 is a valve 36. Valve 36 is utilized to further control the amount of catalyst flow strictly in accordance with the amount of base material flow.

Hence, the apparatus shown will direct base components of the elastomer as contained in reservoir 31 via tube 30 into the outer tube 18 and thence into the spherical mixing vessel 15. The flow is accomplished by gravity and simultaneously the catalyst components are gravitationally fed from reservoir 32 to tube 19 and into spherical mixing portion 15.

The above described system is completely enclosed and thus serves to prevent foreign particles or deleterious substances from entering the mixing process. Such particles have an adverse effect on the strength of the silicone coating and hence, the coated fiber 21.

The operation of the mixing vessel portion is of extreme interest and essentially, provides a homogeneous mixing of the base and catalyst components while assuring that the fiber 11 is uniformly coated after passage through the vessel 14. As the fiber 11 is directed or drawn into vessel 14 its motion will agitate the base and catalyst components and strictly as a function of the speed at which the fiber 11 is moving or controlled to move. The agitation action as well as their flow pattern is controlled based upon the symmetry of the system to uniformly distribute the same about the periphery or the fiber 11, thus assuring that the fiber will be uniformly and completely coated as directed through the vessel 14.

As shown in the FIGURE, the inlet port 12 is surrounded by a plurality of apertures 40 which serve as a bubble trap to alloy stray bubbles to escape. The actual thickness of the coating is controlled by the nozzle 20 which operates to restrict or limit the diameter of the coated fiber 21 prior to insertion of the same into the curing oven 22. There are, of course, many other ways of limiting the diameter by means of suitable dies or nozzles.

Essentially, the system described enables one to continuously and uniformly coat an optical fiber by assuring a closed system flow. The apparatus depicted enables the reservoirs 31 and 32 to contain the proper proportionate amount of base and catalyst materials as necessary to achieve optimum curing conditions. The reservoirs as 31 and 32 may be graduated for more efficient flow control as well as the fact that control valves as 36 can be employed to further optimize the flow rate of the catalyst or base material or both.

It is noted that the axis of the fiber 11 as directed through the spherical mixing portion 15 is at a relative angle with respect to the annular delivery section 17 to assure that the flow pattern is symmetrical with the axis to accomplish uniform coating of the fiber. This also assures that the fiber as directed will not move laterally since the force and action of the flow pattern when uniform will maintain fiber position.

An X-Y positioner 50 is shown coupled to the nozzle 20 and further adjustments can be made both in the horizontal and vertical planes to assure that the distribution of the flow pattern about the fiber 11 is of properly uniformity to accommodate the coating process.

Typical dimensions of the vessel 14 and the diameter of tubes 18 and 19 were given above. The approximate outside diameter of the outlet port 16 is about 8 mm. The length of the outlet port is about 1½ centimeters. The inlet port 12 includes an outer cylindrical portion 26 having an approximate outside diameter of 10 mm. and a spaced inner cylindrical portion 27 having an approximate outside diameter of 4 mm. A flat annular surface 28 connects portions 26 and 27 and has the apertures 40 formed therein. The approximate length of portion 26 is 8 mm. and the approximate length of portion 27 is 11–12 mm. thereby extending about 3–4 mm into mixing portion 15.

It is understood that the dimensions are by way of example only and the above techniques and apparatus can be employed to accommodate the coating of any diameter fiber by appropriate adjustments in dimensions.

What is claimed is:

1. Apparatus for uniformly coating an elongated member with a polymer formed by the mixing of a first base component and a second catalyst component comprising:

a mixing vessel having an inlet and outlet port along a given axis, each communicating with an internal hollow of said vessel and adapted to receive the elongated member;

first and second component ports relatively transverse to said inlet and outlet ports and each communicating with said internal hollow;

an annular tubular delivery means coupled between component ports, said means including an outer tube adapted to receive one of said components and an inner coaxial tube adapted to receive said other component, said annular tubular means directed at a predetermined angle with respect to said axis of said inlet and outlet ports; and means for moving said elongated member at a predetermined rate through said inlet and outlet ports and hence, through said hollow of said vessel to cause mixing and agitation of said components as delivered to said hollow by said delivery means to cause said elongated member as directed to be coated with said polymer.

2. The apparatus according to claim 1 wherein said mixing vessel is spherical in shape with said inlet and outlet ports located along a given diameter.

3. The apparatus according to claim 1 wherein said elongated member is an optical fiber.

4. The apparatus according to claim 1 wherein said polymer is silicone.

5. The apparatus according to claim 1 wherein said predetermined angle is between 35 to 45 degress with respect to said axis.

6. The apparatus according to claim 1 further including:
a base component reservoir coupled to said outer tube for introducing a supply of base component material thereto, and a catalyst component reservoir coupled to said inner tube for introducing a supply of catalyst material thereto.

7. The apparatus according to claim 1 further comprising means for heating said elongated member to cure said coating.

8. The apparatus according to claim 1 further including valve control means coupled to said annular tubular delivery means to selectively control the rate of flow of a selected one of said components.

9. The apparatus of claim 1 wherein said agitation of said components is manifested in the production of a flow pattern about said elongated member operative to mix and uniformly distribute said polymer about the periphery of said member to thus coat the same.

10. The apparatus according to claim 1 wherein the inlet port of the mixing vessel includes a cylindrical portion extending into the mixing vessel.

11. The apparatus according to claim 1 additionally comprising a plurality of apertures spaced about the inlet port of the mixing vessel.

12. The apparatus according to claim 1 wherein the inlet port of the mixing vessel comprises:
an outer cylindrical portion extending above the vessel about the inlet port;
an inner cylindrical portion spaced from the outer cylindrical portion and concentric therewith, said inner cylindrical portion extending into the vessel; and
a flat annular surface connecting the upper edges of the cylindrical portion and having a plurality of apertures formed therein.

* * * * *